(12) United States Patent
Cleary et al.

(10) Patent No.: US 9,392,124 B2
(45) Date of Patent: Jul. 12, 2016

(54) METHOD TO DETERMINE THE JURISDICTION OF CMRS TRAFFIC VIA CELL SITE LOCATION AND RATE CENTER

(71) Applicant: VERIZON PATENT AND LICENSING INC., Arlington, VA (US)

(72) Inventors: Charles Brian Cleary, Alpharetta, GA (US); Marc B. Sterling, Alpharetta, GA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 70 days.

(21) Appl. No.: 14/338,762

(22) Filed: Jul. 23, 2014

(65) Prior Publication Data
US 2016/0028897 A1    Jan. 28, 2016

(51) Int. Cl.
*H04M 11/00* (2006.01)
*H04M 15/00* (2006.01)

(52) U.S. Cl.
CPC .............. *H04M 15/41* (2013.01); *H04M 15/49* (2013.01)

(58) Field of Classification Search
None
See application file for complete search history.

(56) References Cited

U.S. PATENT DOCUMENTS

| | | | | |
|---|---|---|---|---|
| 6,498,840 | B2* | 12/2002 | Alcott | H04M 15/00 379/114.01 |
| 2004/0252818 | A1* | 12/2004 | Liu | H04M 3/2218 379/126 |
| 2006/0268902 | A1* | 11/2006 | Bonner | H04L 63/102 370/401 |
| 2011/0263220 | A1* | 10/2011 | Bot | H04L 12/1432 455/406 |
| 2011/0263263 | A1* | 10/2011 | Lau | H04M 15/00 455/445 |

* cited by examiner

*Primary Examiner* — Erika A Washington

(57) ABSTRACT

A method includes receiving, at a processor, Call Detail Records (CDRs) from a Data Mediation System, in which each CDR includes a called party number (CdPN) associated with a first device, and a Cell Site ID associated with a location of a cell carrying a communication from a second device. Also included are: obtaining, from a first digital table, a first Major Trading Area (MTA) associated with the CdPN; obtaining, from a second digital table, a second MTA associated with the Cell Site ID; and concluding that the first and second devices are communicating in Local Traffic, if the first MTA is the same as the second MTA. The method may also conclude that the first and second devices are communicating in Long Distance Traffic, if the first MTA and second MTA are not the same.

20 Claims, 7 Drawing Sheets

| SEQUENCE NUMBER | COMMON CDR DATA ||||||| ADDED CDR DATA ||
| | CPN | CdPN | CALL START (DATE TIME) | CALL DURATION (MINUTES) | CN | DISPOSITION | CALL MOU | CELL SITE ID | CELL SITE MTA | CdPN MTA | OTHER FIELDS |
| --- | --- | --- | --- | --- | --- | --- | --- | --- | --- | --- | --- |
| 10011 | 770-797-XXXX | 501-529-XXXX | 042214.22:00:03 | 00:02:00 | 770-797-XXXX | ANSWERED | 01:05 | 796 | 11 | 6 | |
| 10012 | 501-529-XXXX | 770-797-XXXX | 042214.22:00:05 | 00:05:00 | 501-529-XXXX | ANSWERED | 03:10 | 103 | 11 | 11 | |
| 10013 | 206-399-XXXX | 501-529-XXXX | 042214.22:00:10 | 00:00:00 | 206-399-XXXX | UNANSWERED | 05:00 | 104 | 6 | 11 | |
| 10014 | 501-517-XXXX | 501-529-XXXX | 042214.22:00:15 | 00:11:00 | 501-517-XXXX | ANSWERED | 06:01 | 776 | 6 | 6 | |
| 10015 | 412-672-XXXX | 501-529-XXXX | 042214.22:00:32 | 00:03:00 | 412-672-XXXX | ANSWERED | 01:00 | 543 | 11 | 11 | |
| 10016 | 412-664-XXXX | 770-797-XXXX | 042214.22:00:38 | 01:04:00 | 412-664-XXXX | ANSWERED | 00:53 | 051 | 11 | 11 | |

FIG. 3

| CELL SITE TABLE (CELL SITE DATA SOURCE) | | | |
|---|---|---|---|
| CELL SITE ID. | MTA | "OTHER" IRRELEVANT CELL SITE DATA | "MISC" IRRELEVANT DATA |
| GA2345 | 11 | | |
| GA3765 | 11 | | |
| SC1234 | 6 | | |
| SC5436 | 6 | | |

FIG. 5A

| COMBINED TABLE | | | | | | |
|---|---|---|---|---|---|---|
| A | B | C | D | E | F | G |
| CELL SITE ID (CELL SITE TABLE) | CELL SITE MTA (CELL SITE TABLE) | CELL SITE ID (CDR) | CALL MOUs (CDR) | CdPN (CDR) | CdPN MTA (LERG) | "OTHER" IRRELEVANT ASSOCIATED DATA |
| GA2345 | 11 | GA2345 | 00:12 | 770-555-1234 | 11 | |
| GA3765 | 11 | GA3765 | 00:04 | 770-555-6789 | 11 | |
| SC1234 | 6 | SC1234 | 00:25 | 678-555-1234 | 11 | |
| SC5436 | 6 | SC5436 | 00:06 | 843-555-1234 | 6 | |

FIG. 5B

| COMBINED TABLE | | | | | | |
|---|---|---|---|---|---|---|
| A | B | C | D | E | F | G |
| CELL SITE ID (CELL SITE TABLE) | CELL SITE MTA (CELL SITE TABLE) | CELL SITE ID (CDR) | CALL MOUs (CDR) | CdPN (CDR) | CdPN MTA (LERG) | "OTHER" IRRELEVANT ASSOCIATED DATA |
| GA2345 | 11 | GA2345 | 00:12 | 770-555-1234 | 11 | |
| GA3765 | 11 | GA3765 | 00:04 | 770-555-6789 | 11 | |
| SC1234 | 6 | SC1234 | 00:25 | 678-555-1234 | 11 | |
| SC5436 | 6 | SC5436 | 00:06 | 843-555-1234 | 6 | |

INTER-MTA CALL (CALL TRAFFIC)

FIG. 5C

METHOD TO DETERMINE THE JURISDICTION OF CMRS TRAFFIC VIA CELL SITE LOCATION AND RATE CENTER

BACKGROUND

Within the telecommunications industry, interconnection is the physical linking of a carrier's network with equipment or facilities not belonging to that network for the exchange of telecommunications traffic such as a voice call. The term may refer to a connection between a carrier's facilities and the equipment belonging to its customer, or to a connection between carriers. The interconnection between carriers also involves different rates, known as Minute-of-Usage (MOU) rates, which are applied to the voice traffic exchanged. The MOU rates depend on identifying the jurisdiction of the voice traffic exchanged. The jurisdiction may be either Local (also referred to as non-Access) or Long Distance (also referred to as Access). The Federal Communications Commission (FCC) has established MOU rates covering compensation between carriers or providers exchanging telecommunications traffic (compensation regarding the origination and termination of calls between carriers/providers).

Conventionally, MOU rates are applied to the voice traffic exchanged. The FCC, however, has established that Bill-and-Keep (B&K) applies to Local Traffic, or non-Access Traffic exchanged between a Commercial Mobile Radio Service (CMRS) Provider, such as Verizon Wireless®, and a Rural Local Exchange Company (RLEC). B&K, or BAK, is a pricing arrangement for the interconnection of two telecommunications networks under which the reciprocal call termination charge is zero. That is, each network agrees to terminate calls from the other network at no charge or the equivalent rate of $0.00 per MOU. Positive MOU rates (greater than $0.0) remain applicable to the Long Distance Traffic, or Access Traffic, exchanged between a CMRS Provider and an RLEC.

As a result, accurately determining the jurisdiction of a call exchanged between a CMRS Provider and a Local Exchange Carrier (LEC) as being either Local (non-Access) Traffic, or Long Distance (Access) is required to validate network compensation, or expenses. A need also exists to verify the network compensation and identify opportunities to control, or reduce network expenses.

As will be explained, an aspect of the traffic tracking system of the present application identifies the jurisdiction of voice traffic exchanged between a CMRS Provider, such as Verizon Wireless®, and another local provider, such as a Rural Local Exchange Carrier (RLEC). Another aspect of the traffic tracking system of the present application validates the network expenses of the CMRS Provider and identifies opportunities to control or reduce network expenses.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 3 illustrates an example of a Call Detail Record (CDR) including added enriched fields;

FIG. 5a illustrates an example of a cell site table identifying corresponding Major Trading Areas (MTAs) that may be stored in a database of a CMRS Provider, in accordance with an aspect of the present application;

FIGS. 5b and 5c illustrate examples of a Combined Table used to reach a decision of whether a call is inter-MTA Traffic or intra-MTA Traffic;

DETAILED DESCRIPTION

In the following detailed description, specific details are set forth by way of examples in order to provide a thorough understanding of the relevant teachings. However, it should be apparent that the present teachings may be practiced without such details. In other instances, well known methods, procedures, components, and/or circuitry have been described at a relatively high level, without detail, in order to avoid unnecessarily obscuring aspects of the present teachings.

As will be explained, the traffic tracking system of the present application may perform several types of enrichment on Call Detail Records (CDRs). The relevant CDRs are generated by the CMRS Provider's telecommunications switch, collected by the CMRS Provider's Data Mediation System, and stored in the CMRS Provider's database.

Figure 1:
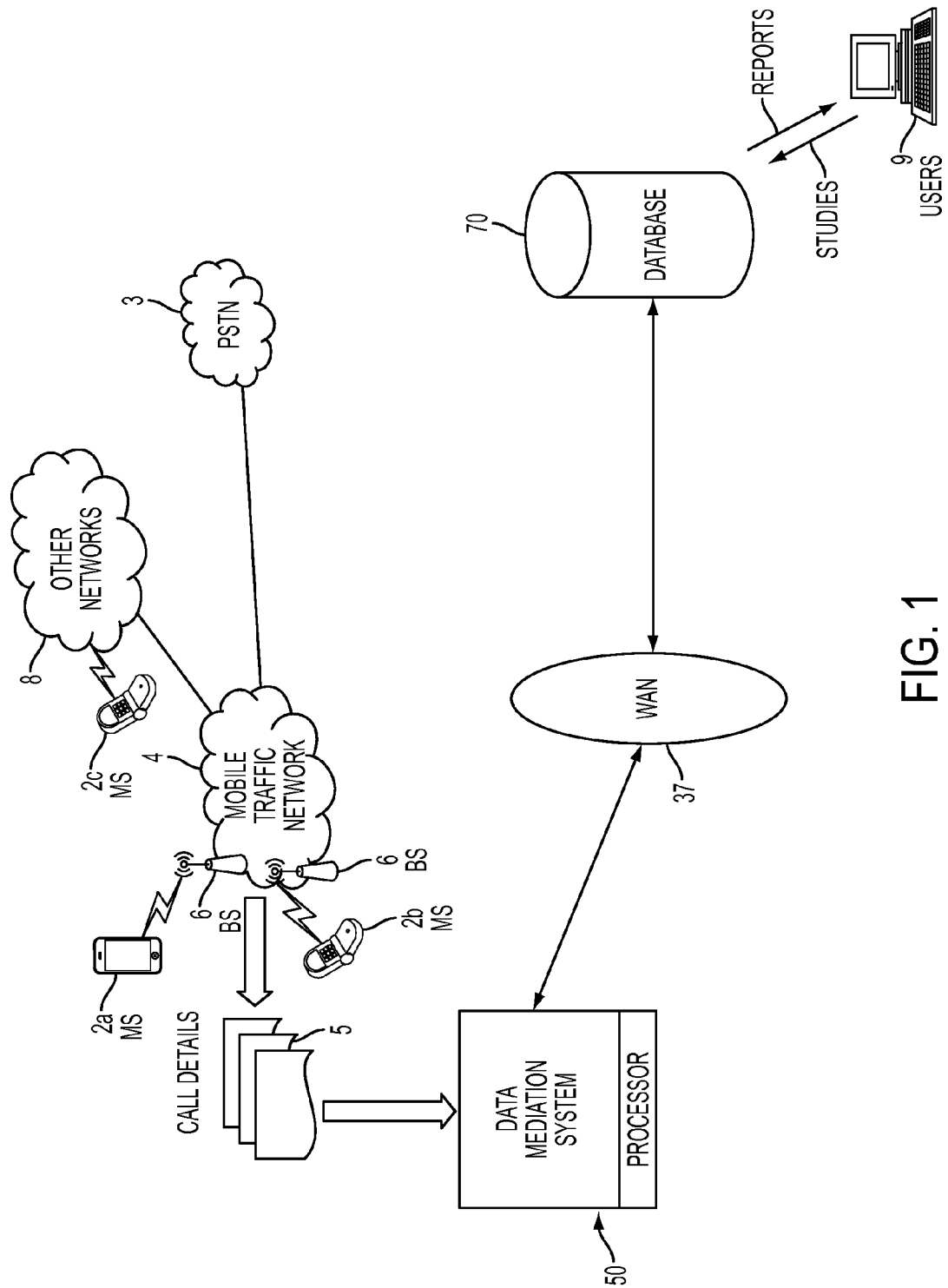
FIG. 1 is a block diagram showing high-level functional aspects of a traffic tracking system.

FIG. 1 provides a high-level illustration of a traffic tracking system. Typically, customers using subscriber devices, such as mobile telephone 2b, make calls through the Public Switching Telephone Network (PSTN) 3. The Mobile Traffic Network 4 that originates the call uses certain monitoring equipment to accumulate Call Detail Records (CDRs) 5. Each CDR includes a wide variety of information including the calling and called party numbers, the time of the call, the duration of the call if completed, the type of release if terminated without completion, identification of office(s) serving the call, etc.

In the example shown in FIG. 1, Mobile Traffic Network 4 communicates with PSTN 3. For the sake of simplicity, only two mobile stations (MSs) 2a and 2b are shown communicating through Mobile Traffic Network 4, by way of two base stations (BSs) 6. Other Networks 8, using mobile station (MS) 2c, are shown communicating with Mobile Traffic Network 4 and PSTN 3. As an example, Mobile Traffic Network 4 may be a CMRS Provider (e.g., Verizon Wireless®) and Other Networks 8 may be other additional providers. It will be understood that Mobile Traffic Network 4 and Other Networks 8 may accumulate Call Detail Records 5 without transmitting through PSTN 3.

The Mobile Traffic Network 4 allows users of mobile stations 2a and 2b (and other mobile stations not shown) to initiate and receive telephone calls to each other, as well as through PSTN 3 when using telephones connected to the PSTN. The networks 4 and 8 typically also offer a variety of data services, via a global network (e.g., the Internet), such as downloads, web browsing, email, etc.

The networks 4 and 8 may be implemented by a number of interconnected networks. They may include Radio Access Networks (RANs), as well as a Wide Area Network (WAN) interconnecting regional ground networks to core network elements. A regional portion of network 4, such as that serving mobile stations 2a and 2b, may include one or more RANs and a regional circuit and/or packet switched network and associated signaling facilities.

Physical elements of a RAN operated by one of the mobile service providers or carriers include a number of base stations represented by base stations (BSs) 6. Although not separately shown, base station 6 may include a Base Transceiver System (BTS), which may communicate via an antennae system at the site of the base station and over an airlink with one or more mobile stations 2a and 2b. Each base station may include a BTS coupled to several antennae mounted on a radio tower within a coverage area, often referred to as a "cell." The Other Networks 8 may also include a traffic network which carries communications between base stations and other elements. It will be understood that the various network elements may communicate with each other and other networks (e.g., PSTN 3 and the Internet) either directly, or indirectly.

Although not shown, a provider or carrier may also operate a number of systems that provide ancillary functions in support of the communication services provided through mobile data networks 4 and 8, and those elements may communicate with other nodes or elements in the system, via one or more private packet data networks (sometimes referred to as an Intranet). Examples of such systems may include one or more application servers and related servers.

The Call Detail Records (CDRs) 5 supplied from Mobile Traffic Network 4 (the CMRS Provider) may be sent to the CMRS Provider's Data Mediation System 50. The Data Mediation System 50 may potentially collect CDRs from PSTN 3, or Other Networks 8. Networks, however, do not always generate the same types of CDRs (or CDRs of the same format), and providers are typically required to pay fees to obtain CDRs from another provider's network. As a result, the carrier originating the traffic, i.e. the CMRS Provider, typically relies on the CDRs generated from its own network (its own telecommunication equipment). Information contained in the CDRs may be loaded into appropriate tables in one or more databases. Further processing, however, may be needed to allow analysis and output of the results in desired aggregate forms. Thus, information from Data Mediation System 50 may be prepared and uploaded through WAN 37 (for example) for input to a Decision Support Database 70. This may include modifying the call details by application of reference data. The reference data may include Local Exchange & Routing Guide (LERG) data such as the Operating Carrier Number (OCN), local call jurisdiction data, and/or other information used to enrich the overall CDR data. It will be appreciated that the Data Mediation System and the Decision Support Database may be located in one system or separate systems and may be coupled directly, without a WAN as an interface in between. The prepared call details may be compiled into data reports for output to a user's terminal 9 (for example). The Database 70 may capture and store high level summary data which may be displayed through user terminal 9 in a variety of ways.

The traffic tracking system of the present application, thus, provides effective collection and analysis of CDRs enriched with various information. The CDRs required for analysis may be collected from a single provider's network, without reliance on the use of CDRs from another provider's network. The enriched CDRs enable analysis of how traffic is exchanged (directly or indirectly) between the CMRS Provider and another provider.

Figure 2:
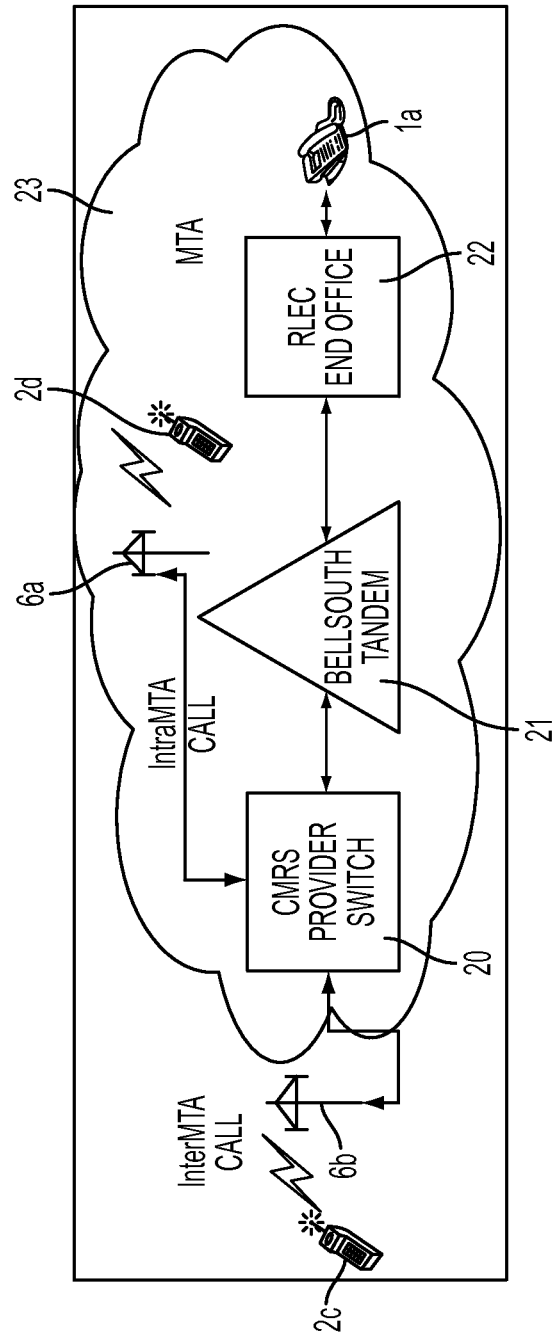
FIG. 2 provides a block diagram overview of a public switching telephone network, illustrating a CMRS Provider's Switch connected to an RLEC End Office through an intermediary switch, such as BellSouth Tandem.

It may be helpful at this point to review the structure and operation of a telephone network, at a relatively high level. Referring to FIG. 2, there is shown a block diagram of a switching telephone network. In general, the switched portion of the telephone network includes a series of telecommunication switches, which are conventionally referred to as signaling points (SPs). Certain of these SPs comprise End Offices (EOs), Mobile Switch Centers (MSCs), or Tandems. The telephone network may include many segments operated by different carriers. For purposes of this discussion, FIG. 2 illustrates three such segments, or sub-networks. One sub-network is a CMRS Provider who controls MSC 20. The CMRS Provider may be Verizon Wireless®, for example. The second sub-network is BellSouth, for example, who controls Tandem Switch 21. The third sub-network is represented by a Rural Local Exchange Company (RLEC) operating End Office Switch 22. Each sub-network may have its own Data Mediation System 50. The RLEC 22 may be another CMRS Provider and the Tandem 21 may be an Intermediate Provider.

Still referring to FIG. 2, the CMRS Provider's MSC 20, BellSouth Tandem 21 and RLEC End Office 22 are all located within the same Major Trading Area (MTA) 23. There are 51 MTAs located across the U.S. As shown, Base Station 6a and mobile phone 2d are both located in MTA 23. The wired telephone 1a is also located in MTA 23. Base Station 6b and mobile phone 2c, on the other hand, are both located in another MTA (not labeled). According to FCC rules, voice traffic exchanged between mobile phone 2d and wire-line phone 1a is considered an intra-MTA call. Although the voice traffic exchanged is routed through CMRS Provider's MSC 20, BellSouth Tandem 21 and RLEC End Office 22, the entire exchange is considered an intra-MTA call. The voice traffic exchanged between cell phone 2d and cell phone 2c, however, which is routed through the CMRS Provider's MSC 20 and Base Station 6b, is considered an inter-MTA call.

The FCC also established traffic rates. Traffic to or from a CMRS Provider that originates and terminates within the same MTA is subject to Local (non-Access) rates. Traffic which originates from within one MTA and terminates within a different MTA is subject to Long Distance (Access) rates. Furthermore, the FCC transitioned rates for non-Access traffic exchanged with CMRS Providers to B&K, or BAK, or the equivalent MOU rate of $0. As a result, accurately determining the jurisdiction (non-Access or Access) of CMRS Provider's traffic is required to validate network expenses and identify opportunities to control or reduce expenses. The FCC, however, has never adopted a method for accurately measuring the amount of Intra-MTA and Inter-MTA traffic exchanged between a CMRS Provider and various LECs. As a result, CMRS Providers and LECs negotiate factors which are intended to roughly represent the amount (percentage) of non-Access (Intra-MTA) Traffic or Access (Inter-MTA) Traffic. An aspect of the application which provides an accurate method of determining the jurisdiction of traffic exchanged between a CMRS Provider and a LEC will now be described.

When wireline carriers (LECs) exchange traffic between their networks, the Calling Party Number (CPN) and Called Party Number (CdPN) may be used to determine geographically where the call originated and where the call terminated. This is possible because wire-line numbers are fixed (not mobile). The first six digits of the "number" (NPA-NXXs) of the CPNs and CdPNs may be used to derive a geographic location for the origination and termination points of the call. The LECs may also use parameters, such as a Jurisdiction Information Parameter (JIP), which is an NPA-NXX assigned to a telecommunications switch to determine the origination and termination points of a call. Therefore, the origination and termination points of LEC to LEC calls may be compared geographically to determine if a call is Local (non-Access) or Long Distance (Access). Since CMRS Providers' phones are mobile, the CPN (mobile subscriber's number) has no relationship to where a call may originate. The use of a JIP to determine the jurisdiction of traffic may create inaccurate results, since a CMRS Provider's MSC may be located in one MTA and the CMRS Provider's mobile phones may be located in multiple MTAs.

An aspect of the method for determining accurate jurisdiction of traffic between a CMRS Provider and another provider, such as a LEC, uses data fields commonly found in a CDR and other data fields which may be used to enrich the CDR. Turning first to the CDR, FIG. 3 shows an example of a CDR collected by a CMRS Provider from a Mobile Switching Center (MSC). Generally, CDRs are created at the end of a call. By way of simplistic example, a CDR describing a particular phone call may include the phone numbers of both the calling and receiving parties, the start time, and duration of the call. Once collected, the CDRs are checked (validation), reformatted (normalization) and consolidated for further processing. The combined process of collection, validation, normalization and consolidation is also referred to as Data Mediation.

The format in which CDRs are provided varies and is often configurable. Traditionally, the generating and handling of CDRs is known as Automatic Message Accounting or AMA which came into existence back in the 1940s. Today, telecommunications switches in North America generate CDRs in the AMA format. The number (quantity) of data fields and information contained in the data fields of AMA formatted CDRs may vary based on the type of call (Local, Long Distance, Operator Services, International, Emergency, etc.) processed by a telecommunication switch. CDRs generated by telecommunication switches commonly include data fields containing the following information:

a) a unique sequence number identifying the CDR (Sequence Number),
b) the phone number of the subscriber originating the call (Calling Party or CPN),
c) the phone number receiving the call (Called Party or CdPN),
d) the starting time of the call (date and time),
e) the call duration (start to end time of the call),
f) the billing phone number that is charged for the call (Charging Number or CN),
g) the disposition or the results of the call, indicating, for example, whether or not the call was connected (Disposition),
h) the route by which the call left the telecommunication switch (Trunk Group Number), and
i) any fault condition encountered (Fault Code or Cause Code).

In FIG. 3, three common data fields in the CDR are of interest to an aspect of the present method, namely, the CdPN, the Cell Site ID, and the Call Minutes of Usage (MOU).

Other data fields containing more relevant information may be added to a CDR, thereby growing the number of data fields associated with the CDR and, thus, enriching the information contained in the CDR. FIG. 3 shows each CDR identified by a unique sequence number, including a CdPN MTA, which identifies the MTA associated with the CdPN. The CdPN MTA and other data fields may be appended to the common CDR data fields.

Figure 4:
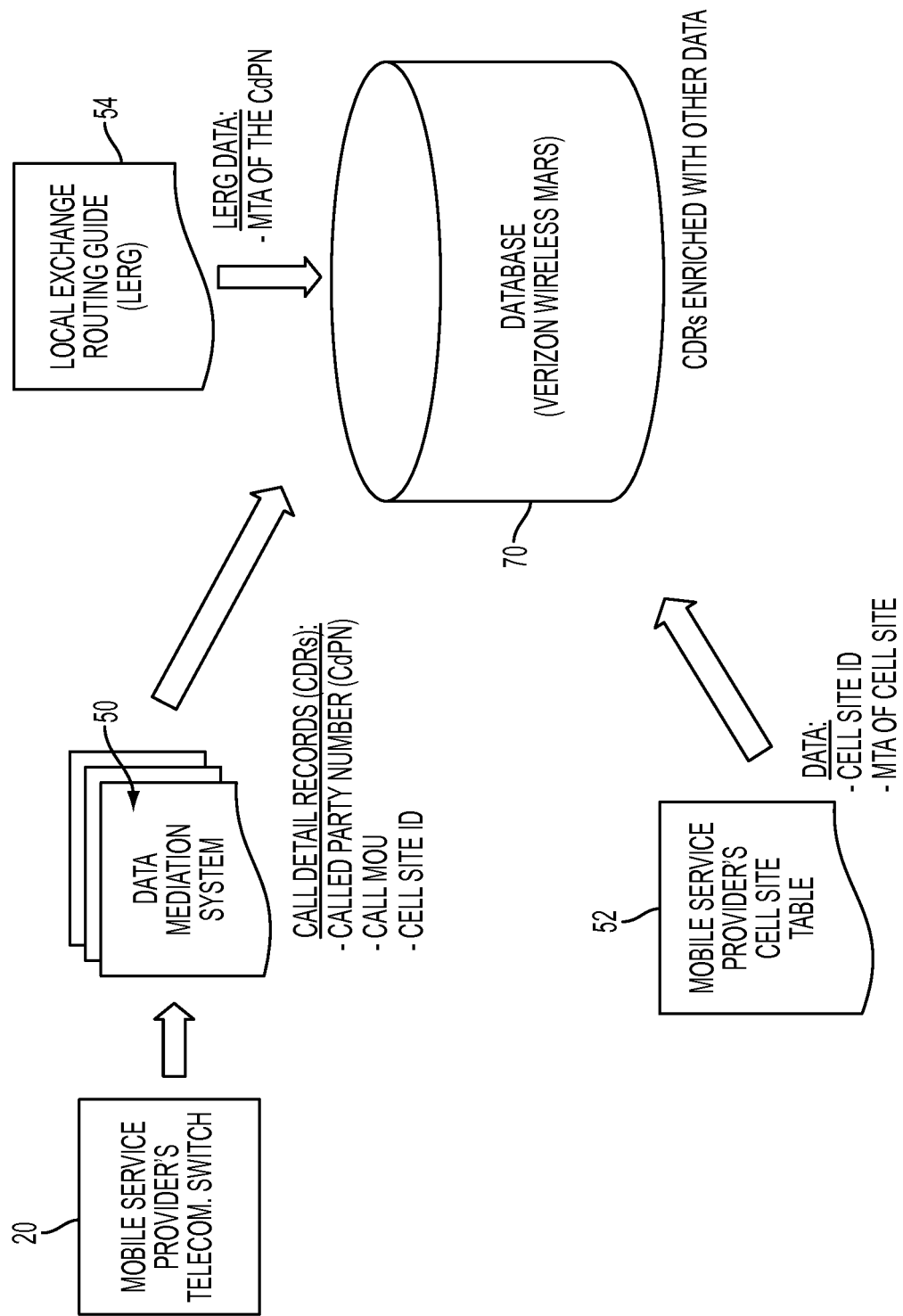
FIG. 4 provides a block diagram of a provider's Data Mediation System collecting call records and enriching the call records with additional data, in accordance with an aspect of the present application.

Referring next to FIG. 4, there is shown a system for enriching and analyzing CDR data to determine the jurisdiction of CMRS traffic, where the CMRS Provider may be Verizon Wireless® (for example). A Mobile Switching Center (MSC) of a CMRS Provider, such as MSC 20 (also shown in FIG. 2) is shown communicating with Data Mediation System 50, the latter processing call details 5 (FIG. 1) and generating a CDR for each call transacted by MSC 20. The CDR includes the Called party Number (CdPN). The CdPN may be, for example, a 10 digit telephone number conventionally used in the U.S. (770-203-XXXX). The CDR also includes the Cell Site ID which generated the call through the CMRS Provider's MSC 20. The CDR also includes the call MOU which identifies the minutes used in the communication exchange between the CMRS Provider's MSC and another provider's Switch (for example, RLEC End Office 22 (FIG. 2)).

The Telcordia Local Exchange Routing Guide (LERG) 54 includes MTA data of the CdPN. This data may be added as enriched data to the common CDR data, as shown in FIG. 3. The data identifies the MTA in which the CdPN is located and, as explained below, may be used by Database (for example, the Verizon Wireless® MARS Database) 70 to determine the jurisdiction of the communication exchange. An example of the data field indicating the MTA of the CdPN is shown in column F of the Combined Table depicted in FIG. 5b. It will be appreciated that columns C, D and E of the Combined Table show the aforementioned common CDR data fields, namely, Cell Site ID (column C), call MOU (column D) and CdPN (column F), respectively.

Another table, referred to herein as the Cell Site Table, is shown in FIG. 5b which may be tabulated by a CMRS Provider, such as Verizon Wireless®. As shown, Table 52 may be compiled to list the Cell Site Identifications (IDs) and the MTA associated with each Cell Site ID. These data fields are shown in Columns A and B of FIG. 5a.

Figure 6:
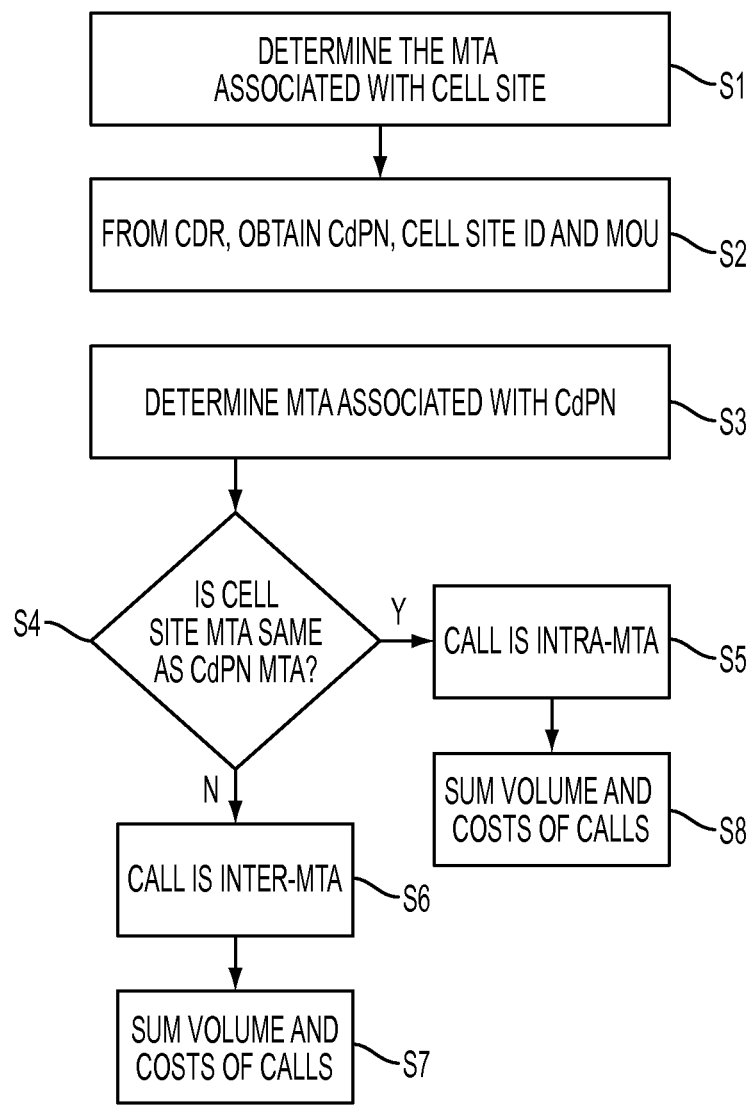
FIG. 6 is a flow diagram showing a method of the present application for identifying whether a voice exchange is Local Traffic (non-Access) or Long Distance Traffic (Access)

Having described the data fields in the Combined Table of FIG. 5a, a method of determining jurisdiction of CMRS Traffic is now described. The method combines specific information regarding the location of a Cell Site (the MTA in which the CMRS Provider's Cell Site is located with data from CDRs collected by the CMRS Provider's MSC to determine the MTA of the Cell Site and the MTA of the LEC CdPN. The combined data may be analyzed (sorted) to accurately identify (measure) the Intra-MTA (non-Access) Traffic and Inter-MTA (Access) Traffic exchanged between the CMRS Provider and a LEC. As shown in FIG. 6, various steps may be used to measure the amount of Intra-MTA Traffic and Inter-MTA Traffic.

Based on the location of Cell Sites and MTA boundaries, Step 1 (S1) determines the MTA in which each Cell Site is located. A table is compiled which lists the Cell Site Identification (ID) and the MTA associated with each Cell Site (MTA in which each Cell Site is located). FIG. 5a provides an example of a table format.

From the CDRs generated by an MSC, Step 2 (S2) identifies the following key parameters contained in each CDR:
Called Party Number (CdPN),
Cell site ID (Cell ID), and
Call Minutes of Usage (MOUs).

The Telcordia Local Exchange Routing Guide (LERG) lists the MTA in which telephone numbers of U.S. Carriers (Providers) are located. Within the LERG, each block or range of telephone numbers is associated with a Rate Center (RC) at an NPA-NXX level, where NPA-NXX is the first six (6) digits of a ten (10) digit telephone number. Each NPA-NXX is associated with an RC and each RC is associated with a MTA. Therefore, the NPA-NXX of a LEC CdPN is used by Step 3 (S3) to identify the RC of the LEC CdPN and determine the MTA in which the LEC CdPN is located.

Thus, from the CDRs, the method identifies the NPA-NXX of the LEC CdPN. Referencing the LERG, the method identifies the RC associated with each CdPN NPA-NXX. Using the RC identified, the method determines the MTA associated with each LEC CdPN NPA-NXX identified in Step 3 (S3).

Next, Step 4 (S4) matches data (associates data) using the Cell Site ID (Cell ID) in the CDR with the Cell Site ID and associated Cell Site MTA in the Cell Site Table; and the MTA of the LEC CdPN is associated with the NPA-NXXs.

Leveraging the associated data within the Combined Table of FIG. 5*b*, the method compares column B (Cell Site MTA (Cell Site Table)) with column F (CdPN MTA (LERG)). When column B matches column F, the call represents an Intra-MTA (non-Access) call, since the call originates and terminates within the same MTA. When column B does not match column F, the call represents an Inter-MTA (Access) call, since the call originates in one MTA and terminates in a different MTA.

Using the associated data within the Combined Table, the method identifies the calls which are Intra-MTA (step S5) and the calls which are Inter-MTA (step S6). This represents the jurisdictionalization of the call (call traffic), in which the jurisdiction may be either Intra-MTA (non-Access) or Inter-MTA (Access).

As shown in FIG. 5*c*, the call between Cell Site ID SC1234 and CdPN 678-555-1234 is an Inter-MTA call, since the call originates in one MTA and terminates in a different MTA. The other calls, however, are Intra-MTA calls, since the calls originate and terminate within the same MTA.

The Call MOUs obtained from the Combined Table may be used to calculate the amount (volume) of Inter-MTA Traffic, Intra-MTA Traffic, or overall traffic. For the Inter-MTA calls identified, the method in Step 7 (S7), totals (sums) the associated Call MOUs to obtain the amount (volume) of Inter-MTA Traffic exchanged. This result may arbitrarily be called X. For the Intra-MTA calls identified, the methods in Step 8 (S8) totals (sums) the associated Call MOUs to obtain the amount (volume) of Intra-MTA Traffic exchanged. This result may arbitrarily be called Y.

Results X and Y may be used to validate the billing or claims from LECs regarding the amount of Inter-MTA Traffic or Intra-MTA Traffic exchanged, respectively. By totaling the Call MOUs associated with the call traffic, the method may calculate, for example, that 22 MOUs are jurisdictionalized as Intra-MTA (non-Access) calls (traffic) and 25 MOUs are jurisdictionalized as Inter-MTA (Access) calls (traffic).

It will be appreciated that a CMRS Provider may exchange traffic with at least one thousand (1,000) LECs. If a typical factor representing the amount of Inter-MTA Traffic (traffic subject to Access rates) is near 8%; and if a typical MOU Access (Inter-MTA) rate is near $0.03/MOU, then a 1% change (reduction) in the amount of Inter-MTA Traffic may generate annual expense savings exceeding $10,800,000.00.

Large national CMRS Providers may have relationships with more than 3,000 LECs and may achieve annual expense savings exceeding tens of millions of dollars, if their negotiated factors are overstating the amount of Access (Inter-MTA) traffic. Applying this method to determine the jurisdiction of CMRS traffic via Cell Site location and Rate Center ensures accurate measurement of traffic and enables negotiation of lower (more appropriate) traffic factors and/or identifies opportunity to address compensation liability associated with traffic factors currently understating the amount of Access (Inter-MTA) traffic.

These general and specific aspects may be implemented using a system, a method, a computer program, a computer readable medium, or an apparatus or any combination of systems, methods, computer programs, computer readable mediums, and/or apparatuses.

As shown by the above discussion, functions relating to enriching CDR with external data and analyzing the data may be implemented on computers connected for data communication via the components of a packet data network, operating with data mediation system 50 and database 70, as shown in FIG. 1. Although special purpose devices may be used, such devices also may be implemented using one or more hardware platforms intended to represent a general class of data processing device commonly used to run "server" programming so as to implement the enrichment and reporting functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for enriching the call records. The software code is executable by the general-purpose computer that functions as the data mediation system 50 on a server device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for enriching the call records with external data, in essentially the manner performed in the implementations discussed and illustrated herein.

Figure 7:
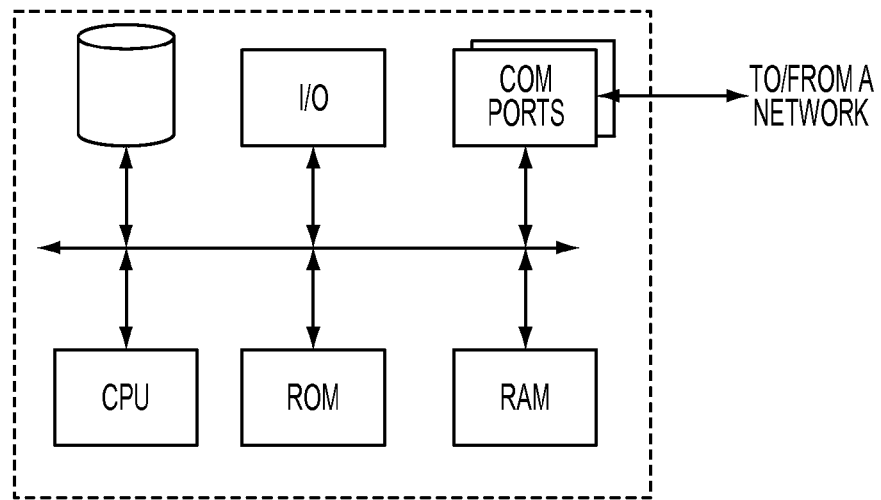
FIG. 7 illustrates a network or host computer platform, as may typically be used to implement a server.
Figure 8:
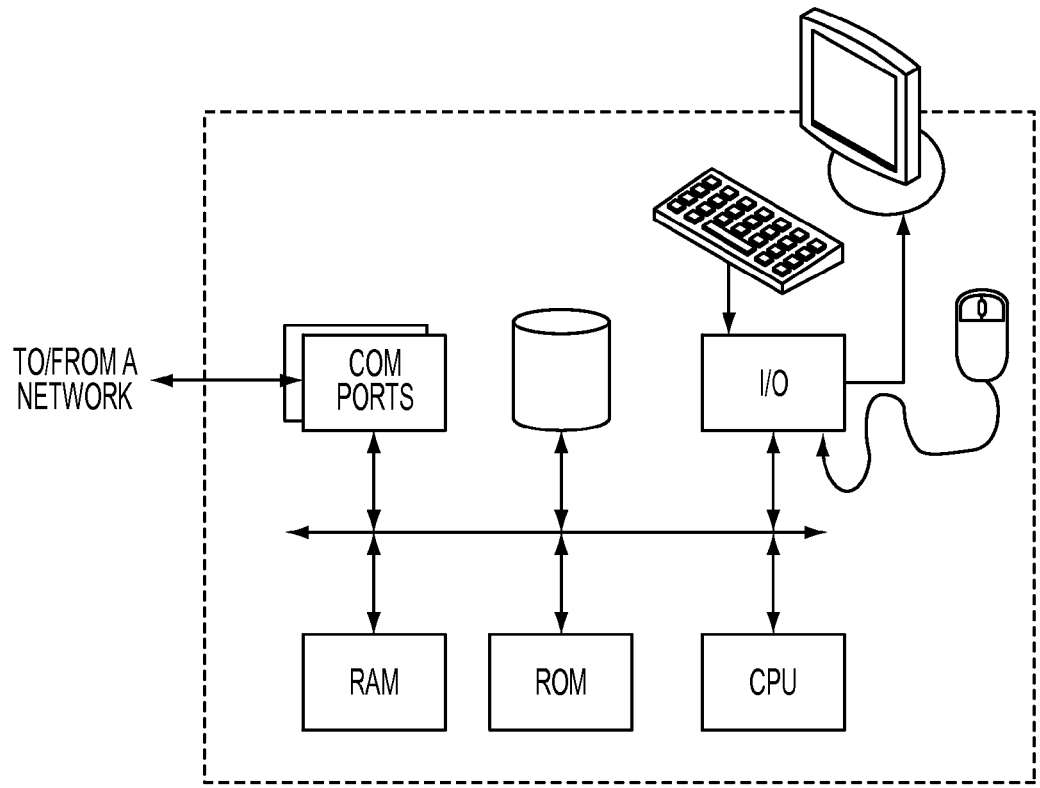
FIG. 8 depicts a computer with user interface elements, as may be used to implement a personal computer, or another type of workstation, or terminal device.

FIGS. 7 and 8 provide functional block diagram illustrations of general purpose computer hardware platforms. FIG. 7 illustrates a network or host computer platform, as may typically be used to implement a server. FIG. 8 depicts a computer with user interface elements, as may be used to implement a personal computer or other type of work station or terminal device, although the computer of FIG. 8 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 8). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

Hence, aspects of the methods of enriching call records with other data outlined above and analyzing the data may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the telephone service provider into the computer platform of running the data preparation process. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the database 70 shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

What is claimed is:

1. A method comprising:

receiving, by a processor, Call Detail Records (CDRs) from a Data Mediation System, in which each of the CDRs includes a called party number (CdPN) associated with a first device and a Cell Site ID associated with a location of a cell supporting a communication from a second device;

obtaining, by the processor and from a first digital table, a first Major Trading Area (MTA) associated with the CdPN;

obtaining, by the processor and from a second digital table, a second MTA associated with the Cell Site ID;

determining, by the processor, that the first and second devices are communicating local traffic when the first MTA is the same as the second MTA; and selectively assigning, by the processor and based on the first and second MTAs, Minutes of Usage (MOU),
the MOU being assigned to a Commercial Mobile Radio Service (CMRS) provider when the first and second MTAs are the same, and
the MOU being assigned to a rural provider when the first and second MTAs are not the same.

2. The method of claim 1, further comprising:
determining, when first MTA and second MTA are not the same, that the first and second devices are communicating long distance traffic.
3. The method of claim 1, wherein:
the first digital table is provided by a Local Exchange Routing Guide (LERG), and
the second digital table is provided by a Mobile Switching Center (MSC) of the CMRS provider.
4. The method of claim 1, further comprising:
storing, in a database, data from the first and second digital tables.
5. The method of claim 1, wherein:
the first digital table includes an MTA of each telephone number of a provider, and
the second digital table includes an MTA of each Cell Site ID associated with the CMRS provider.
6. The method of claim 1, further comprising:
associating each telephone number listed in the first digital table with a Rate Center (RC), and
associating each RC with an MTA.
7. The method of claim 1, further comprising:
associating, based on determining that the first and second devices are communicating local traffic, a zero dollar value to a provider terminating a communication from the first device.
8. The method of claim 1, further comprising:
determining that the first and second devices are communicating long distance traffic when the first MTA and second MTA are not the same, and
associating, based on determining that the first and second devices are communicating long distance traffic, a dollar value to a provider terminating a communication from the first device.
9. The method of claim 8, further comprising:
obtaining the MOU from a CDR that is associated with the provider terminating the communication from the first device, and
summing, based on obtaining the MOU from the CDR that is associated with the provider, the MOU.
10. The method of claim 1, wherein:
a provider of the first device is a Local Exchange Company (LEC) provider, and
the second device communicates with a cell associated with the CMRS provider.
11. A method of determining a jurisdiction of Commercial Mobile Radio Service (CMRS) traffic through a cell site location, the method comprising:
tabulating, by a processor, data in a first table, the data including Cell Site IDs and corresponding Major Trading Areas (MTAs) associated with the Cell Site IDs;
obtaining, by the processor, a Called Party Number (CdPN) from a Call Detail Record (CDR) of a communication exchange between a Mobile Switching Center (MSC) of a CMRS provider and a rural provider;
determining, by the processor, a Rate Center (RC) associated with the CdPN;
identifying, by the processor, a first MTA, of the MTAs, associated with the RC;
obtaining, by the processor, a Cell Site ID, of the Cell Site IDs, from the CDR of the communication exchange;
determining, by the processor, a second MTA corresponding to the Cell Site ID obtained from the CDR;
determining, by the processor, that the jurisdiction of the CMRS traffic is local or non-access when the first MTA and the second MTA are the same; and
selectively assigning, by the processor and based on the first MTA and the second MTA, Minutes of Usage (MOU),
the MOU being assigned to the CMRS provider when the first and second MTAs are the same, and
the MOU being assigned to the rural provider when the first and second MTAs are not the same.
12. The method of claim 11, wherein identifying the first MTA associated with the CdPN comprises:
obtaining data from a second table, tabulated by a Local Exchange Routing Guide (LERG),
the data obtained from the second table including MTAs corresponding to CdPNs.
13. The method of claim 11, further comprising:
determining, when the first MTA and the second MTA are not the same, that the jurisdiction of the CMRS traffic is long distance or access.
14. The method of claim 11, further comprising:
obtaining the MOU from the CDR of the communication exchange.
15. The method of claim 11, wherein selectively assigning the MOU comprises:
assigning each MOU from multiple CDRs to one or more rural providers when first and second MTAs, of the respective CDRs of the multiple CDRs, are not the same in each of the respective CDRs; and
assigning each MOU from the multiple CDRs to the CMRS provider when the first and second MTAs, of the respective CDRs of the multiple CDRs, are the same in each of the respective CDRs.
16. A server device comprising:
a processor, and
a memory storing executable instructions for causing the processor to:
receive Call Detail Records (CDRs) from a Data Mediation System, in which each CDR, of the CDRs, includes a called party number (CdPN) associated with a first device and a Cell Site ID associated with a location of a cell supporting a communication from a second device;
obtain, from a first table, a first Major Trading Area (MTA) associated with the CdPN;
obtain, from a second table, a second MTA associated with the Cell Site ID;
determine that the first and second devices are communicating local traffic when the first MTA is the same as the second MTA; and
selectively assign, based on the first and second MTAs, Minutes of Usage (MOU),
the MOU being assigned to a Commercial Mobile Radio Service (CMRS) provider when the first and second MTAs are the same, and
the MOU being assigned to a rural provider when the first and second MTAs are not the same.
17. The server device of claim 16, wherein the instructions further cause the processor to:
determine, when the first MTA and second MTA are not the same, that the first and second devices are communicating long distance traffic.
18. The server device of claim 16, wherein:
the first table is provided by a Local Exchange Routing Guide (LERG), and
the second table is provided by a Mobile Switching Center (MSC) of a CMRS Provider.
19. The server device of claim 16, wherein the instructions further cause the processor to:
store data in a database,
the data being tabulated in the first and second tables.

20. The server device of claim 16, wherein the instructions further cause the processor to:
> associate a zero dollar value to a provider terminating a communication from the first device based on determining that the first and second devices are communicating local traffic; and
> associate, when the first MTA and second MTA are not the same, a dollar value to the provider terminating a communication from the first device based on determining that the first and second devices are communicating long distance traffic.

* * * * *